United States Patent
Kitahara (10) Patent No.: US 8,284,436 B2
(45) Date of Patent: Oct. 9, 2012

(54) IMAGE DATA PROCESSING APPARATUS AND METHOD

(75) Inventor: Yoshinao Kitahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 849 days.

(21) Appl. No.: 12/221,283

(22) Filed: Aug. 1, 2008

(65) Prior Publication Data

US 2009/0033998 A1   Feb. 5, 2009

(30) Foreign Application Priority Data

Aug. 3, 2007   (JP) ................................ 2007-202825

(51) Int. Cl.
G06K 15/00   (2006.01)
H04N 1/60   (2006.01)
(52) U.S. Cl. ........................................ 358/1.16; 358/1.9
(58) Field of Classification Search ................. 358/1.16, 358/448, 443, 468, 444, 404, 1.9, 2.1; 714/721
See application file for complete search history.

(56) References Cited

U.S. PATENT DOCUMENTS

| | | | |
|---|---|---|---|
| 7,406,611 B2 * | 7/2008 | Takahashi et al. | 713/300 |
| 2009/0132875 A1 * | 5/2009 | Kitahara et al. | 714/721 |

FOREIGN PATENT DOCUMENTS

| | | |
|---|---|---|
| JP | 2000-138884 | 5/2000 |
| JP | 2002-063571 A | 2/2002 |
| JP | 2004-082592 A | 3/2004 |
| JP | 2005-262651 | 9/2005 |
| JP | 2005-262651 A | 9/2005 |
| JP | 2006-272722 | 10/2006 |
| JP | 2006-272723 | 10/2006 |
| JP | 2006-277267 | 10/2006 |
| JP | 2006-343922 | 12/2006 |

* cited by examiner

Primary Examiner — Jerome Grant, II (74) Attorney, Agent, or Firm — Nutter McClennen & Fish LLP; John J. Penny, V.

(57) ABSTRACT

An image data processing apparatus, increase: a reader that reads image data included in an image file in read units of a specified data length from an external storage medium storing the image file; a storage that temporarily saves the image data read by the reader; and a data processor that requests image data to the reader and applying a specified data processing to the image data given from the reader in response to the request; wherein the reader reads image data requested by the data processor from the storage and supplies them to the data processor and, if the image data requested by the data processor cannot be read from the storage, reads image data of a specified data length including the image data from the storage medium and supplies them to the data processor, and the reader optimizes the read unit according to the form of the request from the data processor.

10 Claims, 11 Drawing Sheets

FIG. 6A : DATA PROCESSING ORDER

FIG. 6B : BUFFER STRUCTURE

NUMBERS OF BUFFER

FIG. 7A : DATA PROCESSING ORDER

FIG. 7B : BUFFER STRUCTURE

FIG. 8

FIG. 9A : NO ROTATION

FIG. 9B : ROTATION

IMAGE DATA PROCESSING APPARATUS AND METHOD

CROSS REFERENCE TO RELATED APPLICATION

The disclosure of Japanese Patent Application No. 2007-202825 filed on Aug. 3, 2007 including specification, drawings and claims is incorporated herein by reference in its entirety.

BACKGROUND

1. Technical Field

The invention relates to an image data processing apparatus and an image data processing method that read image data from a storage medium storing image files and processing the read data.

2. Related Art

An image data processing apparatus, which reads image data stored in an external storage medium and applies a data processing to the read image data, includes a storage for temporarily saving image data read from the storage medium to reduce the number of accesses to the storage medium. Image data necessary for data processing are read from the storage to be used for data processing when necessary. For example, an image printing system disclosed in JP-A-2005-262651 includes an image data buffer having lines in excess of print lines of an image, and image data are read from a digital still camera storing image files and saved in the image data buffer. In this image printing system, image data are read by the data length corresponding to a buffer size and the size of the image data buffer is changed according to the file size of the image file.

SUMMARY

In an image data processing apparatus of this type, the readout of image data from an external storage medium such as the above digital still camera or a memory card takes a longer time than the transfer of data in the apparatus. Thus, it is desired to efficiently transmit and receive data to and from these external storage media in order to shorten a data processing time. However, with conventional general technology, such a demand has not yet been met since data are read by the specified data amount determined beforehand. With the technology disclosed in JP-A-2005-262651 described above, the data length is changed merely according to the size of the image file although the read data length is variable. Therefore, there has been a room for improvement in efficient data readout.

An advantage of some aspects of the invention is to provide technology for shortening a data processing time by efficiently reading data from a storage medium in an image data processing apparatus and an image data processing method that read image data from a storage medium storing image files and applying a data processing.

An image data processing apparatus according to an aspect of the invention comprises: a reader that reads image data included in an image file in read units of a specified data length from an external storage medium storing the image file; a storage that temporarily saves the image data read by the reader; and a data processor that requests image data to the reader and applying a specified data processing to the image data given from the reader in response to the request; wherein the reader reads image data requested by the data processor from the storage and supplies them to the data processor and, if the image data requested by the data processor cannot be read from the storage, reads image data of a specified data length including the image data from the storage medium and supplies them to the data processor, and the reader optimizes the read unit according to the form of the request from the data processor.

An image data processing method according to an aspect of the invention is for processing the read image data. The method comprises: temporarily saving image data in a storage, reading image data necessary for data processing to apply a necessary data processing while reading image data including the necessary data in read units of a specified data length from the storage medium to apply the necessary data processing if the image data necessary for data processing are not saved in the storage, and optimizing the data length of the read unit according to the form of the image data necessary for data processing.

In the invention constructed as above, a data length of an imaged data read from a storage medium is optimized according to a form of the image data necessary for data processing rather than being fixed or changed according to the file size. Since the amount and order of data necessary for data processing change depending on the content of processing, even unnecessary data are read if the image data are read by the data amount set beforehand as before. Thus, a processing time is extended by as much as a time consumed for the readout. Since the data length of the read unit upon reading image data from the storage medium is optimized according to the request from the data processing side in this invention, such a problem does not occur. Therefore, according to the invention, it is possible to efficiently read data from the storage medium and to shorten the entire data processing time including the data readout.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DESCRIPTION OF EXEMPLARY EMBODIMENTS

First Embodiment

Figure 1:
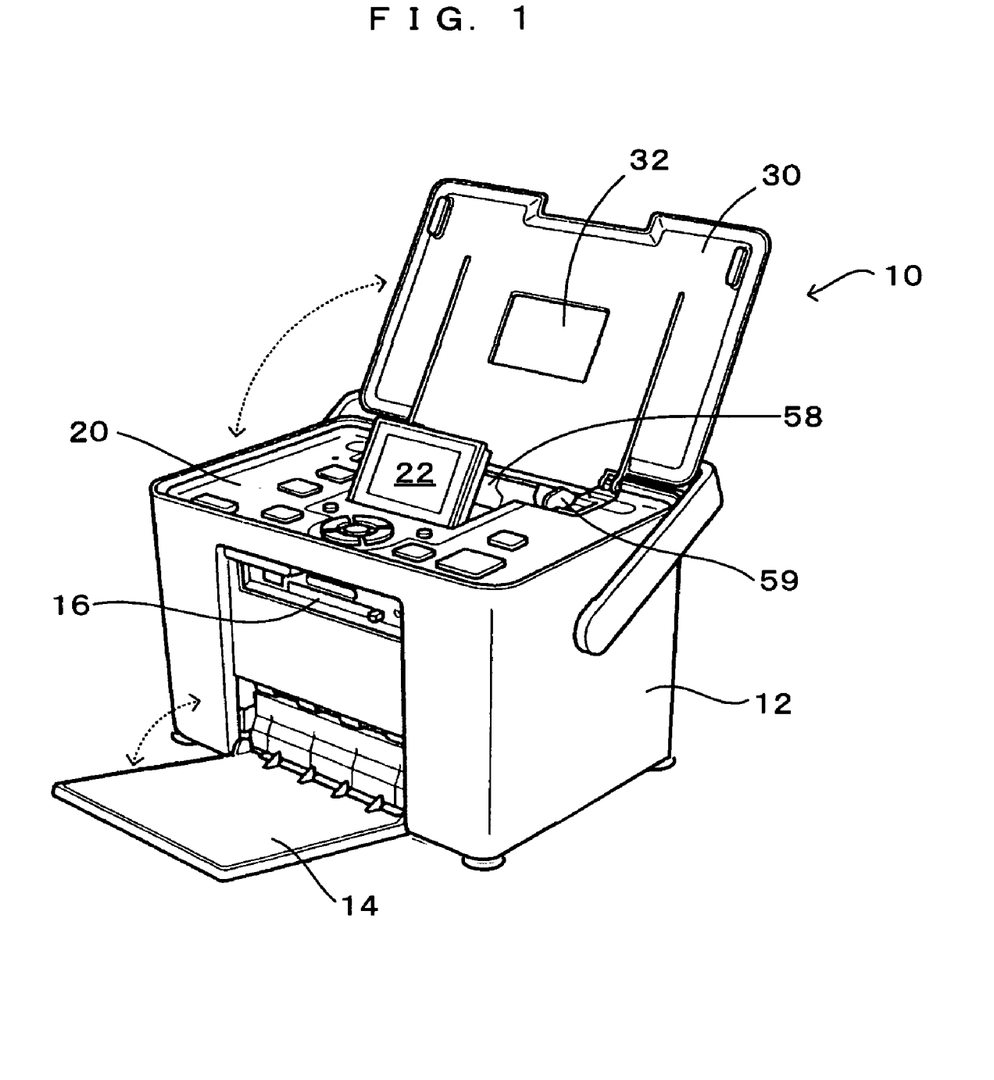
FIG. 1 is a perspective view showing a photo printer as a first embodiment of an image data processing apparatus according to the invention.
Figure 2:
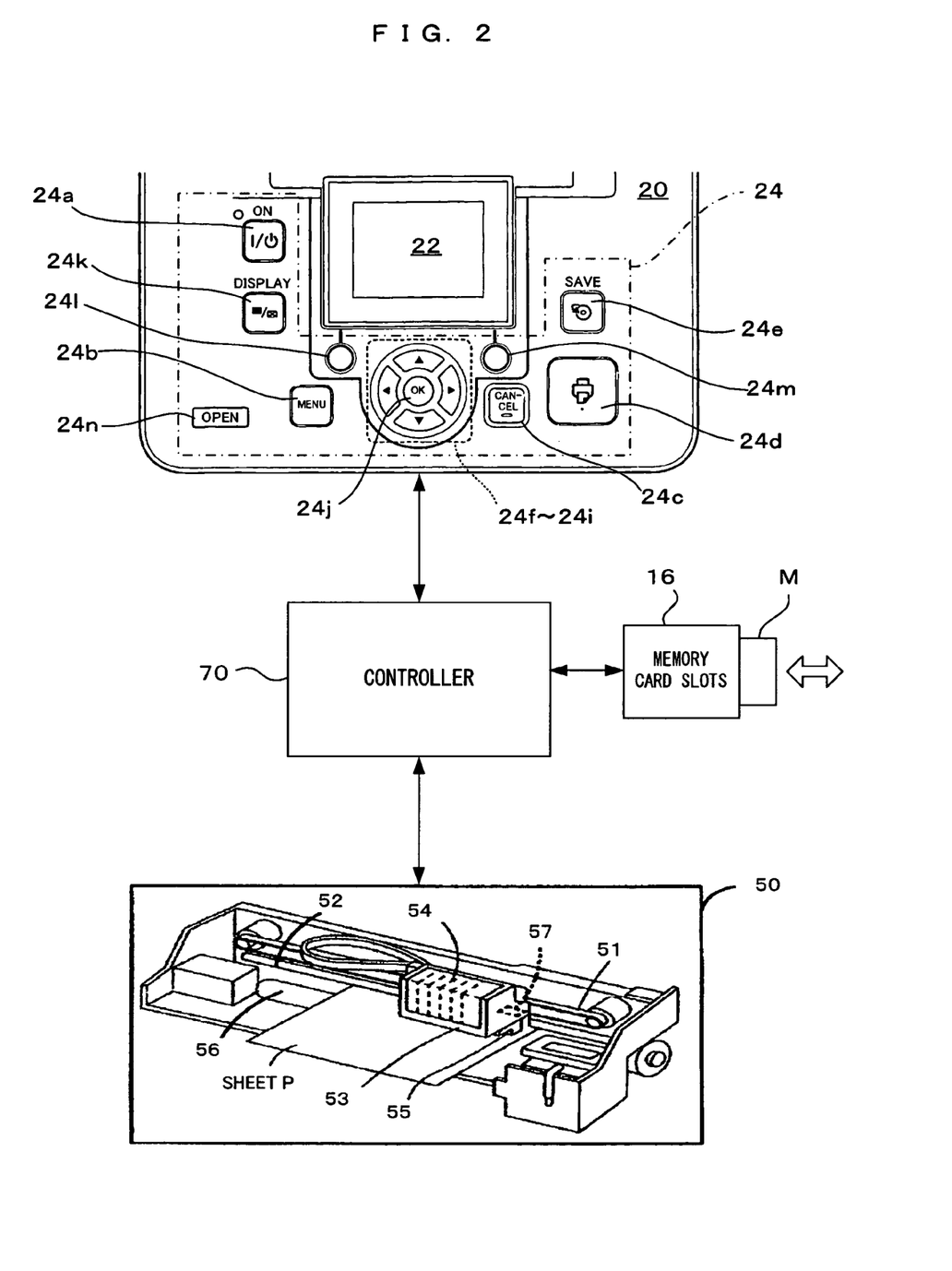
FIG. 2 is a diagram schematically showing the internal construction of the photo printer.

FIG. 1 is a perspective view showing a photo printer as a first embodiment of an image data processing apparatus according to the invention, and FIG. 2 is a diagram schematically showing the internal construction of the photo printer. In this photo printer 10, a print mechanism 50 (see FIG. 2) is built in a printer body 12 and performs printing on a sheet P in accordance with an operation command from a controller 70 (see FIG. 2) for entirely controlling the photo printer 10. The thus printed sheet is discharged to the front side of the printer body 12.

As shown in FIG. 1, a front cover 14 is openably and closably mounted on the front surface of this printer body 12. This front cover 14 is for opening and closing the front surface of the printer body 12. In an open state, the front cover 14 functions as a discharge tray for receiving a sheet P discharged from the print mechanism 50 and a user can use various memory card slots 16 provided at the front surface of the printer body 12. In other words, the user can insert a memory card M storing image files to be printed into the memory card slot 16 in this state. External storage media storing image file data are not limited to memory cards, and may be USB (Universal Serial Bus) memories, disk media and the like. Further, digital cameras, mobile phones and other electronic devices storing images may be caused to function as external storage media by being connected with this photo printer 10 via communication utilizing cables or infrared rays.

An operation panel 20 is provided on the upper surface of the printer body 12, whereas a cover 30 is openably and closably mounted on the back side of the upper surface of the printer body 12. This cover 30 is a resin plate dimensioned to be able to cover the upper surface of the printer body 12 and exposes the outer surface of the operation panel 20 to the outside in an open state (see FIG. 1). On the other hand, if the cover 30 is closed, the entire operation panel 20 is covered.

This operation panel 20 includes an LCD screen 22 constructed, for example, by an LCD display for displaying characters, graphics, symbols, etc., and a button group 24 arranged around the LCD screen 22. As shown in FIG. 2, the button group 24 includes an on button 24a for turning power supply on and off, a display button 24b for calling a main menu screen, a cancel button 24c for canceling an operation halfway or interrupting a printing operation on the sheet P, a print button 24d for instructing the printing operation on the sheet, P, a save button 24e for saving an edited image and the like in the memory card M inserted into the memory card slot 16, 4-way scroll buttons 24f to 24i operated to select a desired one from a plurality of options displayed on the LCD screen 22 and to move a cursor, an OK button 24j arranged in the center of the 4-way scroll buttons 24f to 24i for instructing the determination of the option selected by the 4-way scroll buttons 24f to 24i, a display button 24k for switching a screen displayed on the LCD screen 22, a left soft key 24l for selecting a left guide displayed on the LCD screen 22, a right soft key 24m for selecting a right guide displayed on the LCD screen 22, an open button 24n for opening the front cover 14 having a function as the discharge tray, etc.

For the confirmation of the displayed content of the LCD screen 22, the cover 30 is formed with a window 32 of the same size as the LCD screen 22. In other words, when the cover 30 is in a closed state, the user can confirm the displayed content of the LCD screen 22 through this window 32. On the other hand, when the cover 30 is in the open state, the LCD screen 22 can be adjusted to a desired angle as shown in FIG. 1.

When being set to the open state in this way, the cover 30 is held inclined backward relative to the operation panel 20 and can be used as a tray for feeding a sheet P to the print mechanism 50. A sheet feed portion 58 of the print mechanism 50 and a pair of edge guides 59 transversely slidable so as to adjust a guide width to the width of the sheet are provided at the back side of the operation panel 20.

A sheet P is fed into the print mechanism 50 through the sheet feed portion 58 to be printed. As shown in FIG. 2, in this print mechanism 50, a carriage 53 is driven by a timing belt 51 mounted in a looped state to transversely reciprocate along a guide 52. This carriage 53 includes an optical sensor 57 capable of detecting an end of a sheet P for detecting the left and right ends and the upper and lower ends of the sheet P. In other words, the optical sensor 57 enables the recognition of a sheet width by detecting the left and right ends of the sheet when the carriage 53 scans in a transverse direction before printing the sheet set in the sheet feed portion 58 and enables the recognition of a sheet length by detecting the rear end of the sheet during the printing.

Ink cartridges 54 for individually containing inks of cyan, magenta, yellow, black and other colors are mounted on this carriage 53. These ink cartridges 54 are respectively connected to a print head 55. The print head 55 injects the ink toward the sheet P from a nozzle (not shown) by applying pressure to the ink from the ink cartridge 54. In this embodiment, the print head 55 adopts a method of pressurizing the ink by applying a voltage to a piezoelectric element to deform this piezoelectric element. However, it is also possible to adopt a method of pressurizing the ink by bubbles generated by applying a voltage to a heating resistor (e.g. a heater) to heat the ink. The thus printed sheet P is discharged to the front cover (discharge tray) 14 in the open state by a sheet feed roller 56.

Although not shown, a battery pack can be mounted on the rear surface of the printer body 12, so that this printer 10 can operate on a battery even without being connected with a commercial power supply. Because of this point and another point that this printer 10 is a stand-alone printer usable without being connected with a host computer, this printer 10 is easily portable and usable anywhere.

Figure 3:
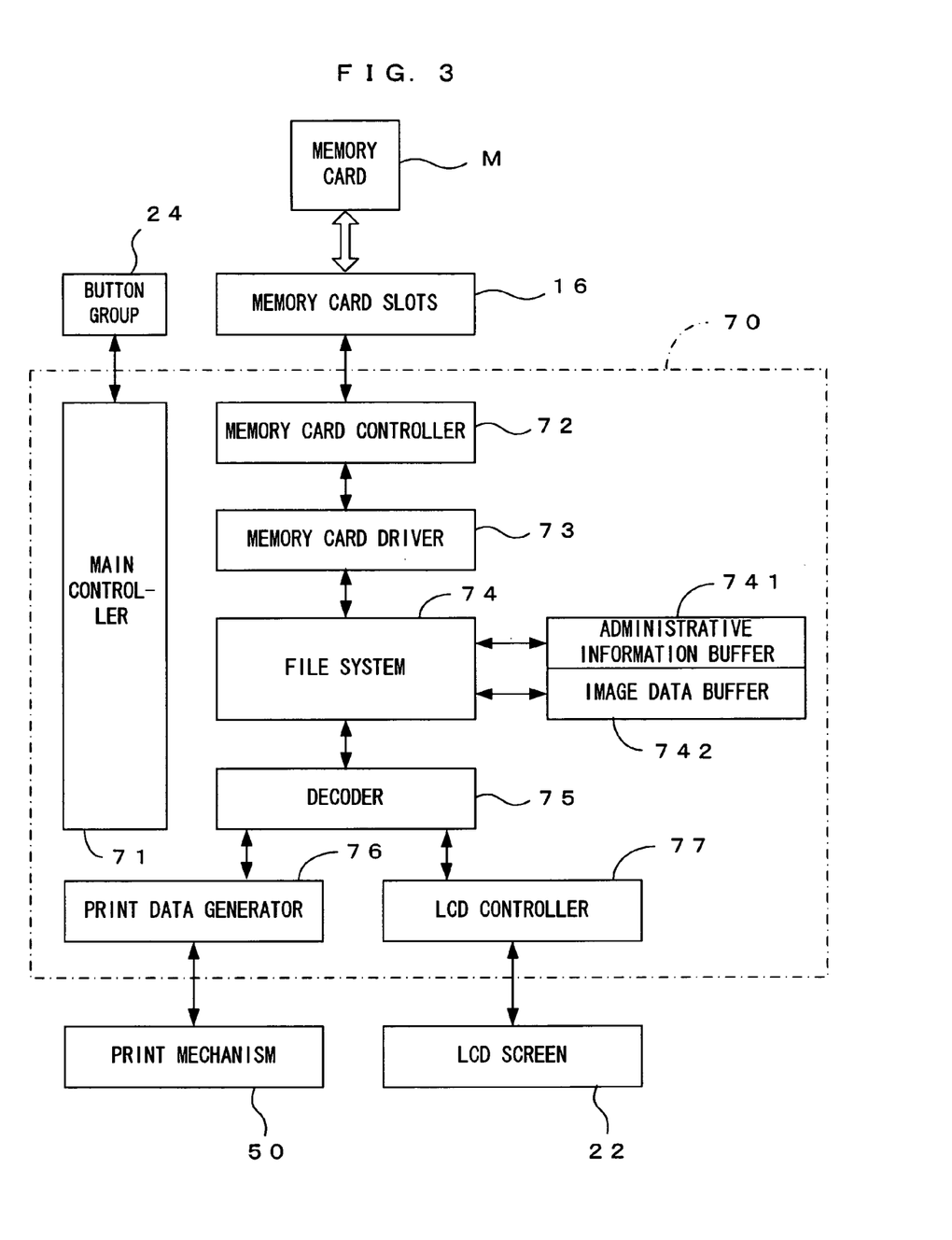
FIG. 3 is a block diagram showing the construction of a controller.

FIG. 3 is a block diagram showing the construction of a controller. As shown in FIG. 3, the controller 70 includes functional blocks such as a main controller 71, a memory card controller 72, a memory card driver 73, a file system 74, an administrative information buffer 741, an image data buffer 742, a decoder 75, a print data generator 76 and an LCD controller 77. Out of these, the respective functional blocks of the main controller 71, the memory card driver 73, the file system 74, the decoder 75 and the print data generator 76 are realized by software. In other words, these functions are realized by an unillustrated CPU executing a predetermined control program.

When a memory card M storing image files are inserted into the memory card slot 16 by the user, the memory card controller 72 detects it and accesses to a memory area of the memory card M to read stored data. Further, the memory card driver 73 controls the memory card controller 72 to read necessary data from the memory card M at specified timings. The file system 74 saves the data read from the memory card M in the administrative information buffer 741 or the image data buffer 742 according to needs. The file system 74 further reads necessary data from the administrative information buffer 741 or the image data buffer 742 in response to a request from the decoder 75 to be described later and outputs a request for reading data from the memory card M to the memory card driver 73.

The decoder 75 decodes the data read from the memory card M and reconfigures the image file. At this time, if the image files stored in the memory card M are data-compressed, the decoder 75 decompresses the data to restore them into data before compression.

The print data generator 76 generates a print control signal based on the data of the image file decoded by the decoder 75 and outputs it to the print mechanism 50. The print mechanism 50 performs a printing operation based on the print control signal to form an image corresponding to the image file on a sheet. The LCD controller 77 generates a video signal based on the data of the image file decoded by the decoder 75 and outputs it to the LCD screen 22. In this way, the image corresponding to the image file is displayed on the LCD screen 22.

The main controller 71 controls the operation of the entire apparatus by monitoring statuses of the above respective parts and giving necessary control signals. The main controller 71 also receives the operation input of the user to the button group 24.

In the photo printer 10 constructed as above, a desired image is obtained by reading an image file stored in the memory card M, applying a necessary processing to generate print image data and operating the print mechanism based on the image data. However, since access to the memory card M as an external storage medium takes a longer time than the transfer of data in the printer, a longer time is required for printing if data necessary for printing are read from the memory card M every time. In order to avoid this problem, the administrative information buffer 741 and the image data buffer 742 are provided.

Both the administrative information buffer 741 and the image data buffer 742 are buffer memories for temporarily saving data, and save data and outputs saved data to the file system 74 in response to a request from the file system 74. Out of these, the administrative information buffer 741 saves directory information and FAT (File Allocation Table) information in the memory card M. The image data buffer 742 saves image data divided into clusters as data constituting the image file and stored in the memory card M. If data are saved in the buffer prior to the printing operation, a printing time can be shortened.

Figure 4:
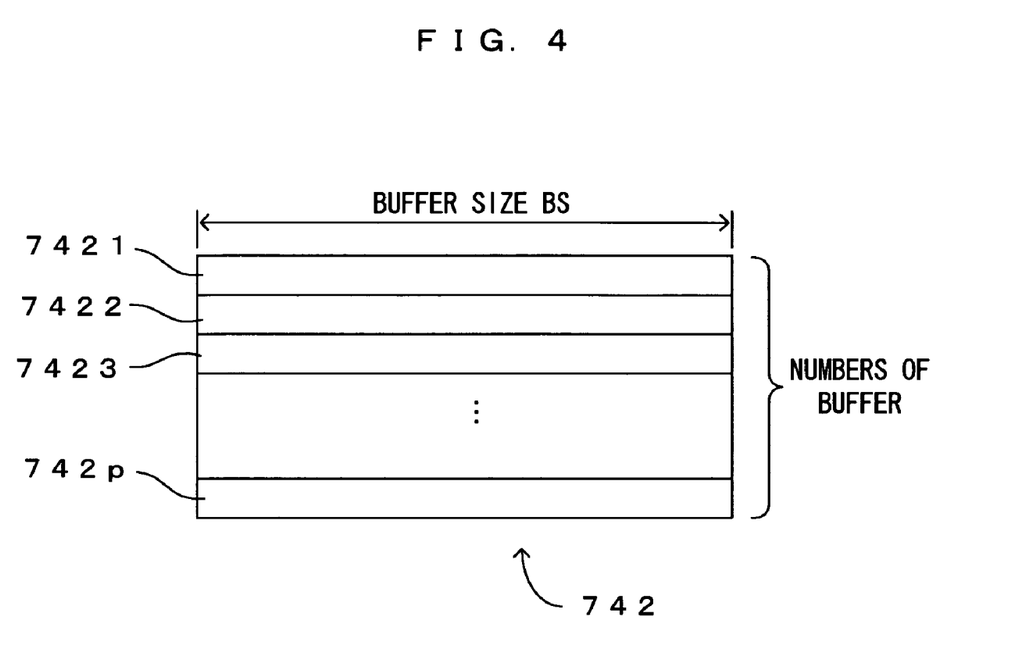
FIG. 4 is a diagram showing the construction of the image data buffer.

FIG. 4 is a diagram showing the construction of the image data buffer. As shown in FIG. 4, the image data buffer 742 is a FIFO (first In First Out) buffer including a specified number of (p in this example) line buffers 7421, 7422, ..., 742p of a specified buffer size. As described below, the read unit of image data from the memory card M is changed according to the form of a data request from the decoder 75 and, accordingly, the buffer size BS and the number p of the respective line buffers of the image data buffer 742 are also changed. This principle will be described below.

Figure 5A:
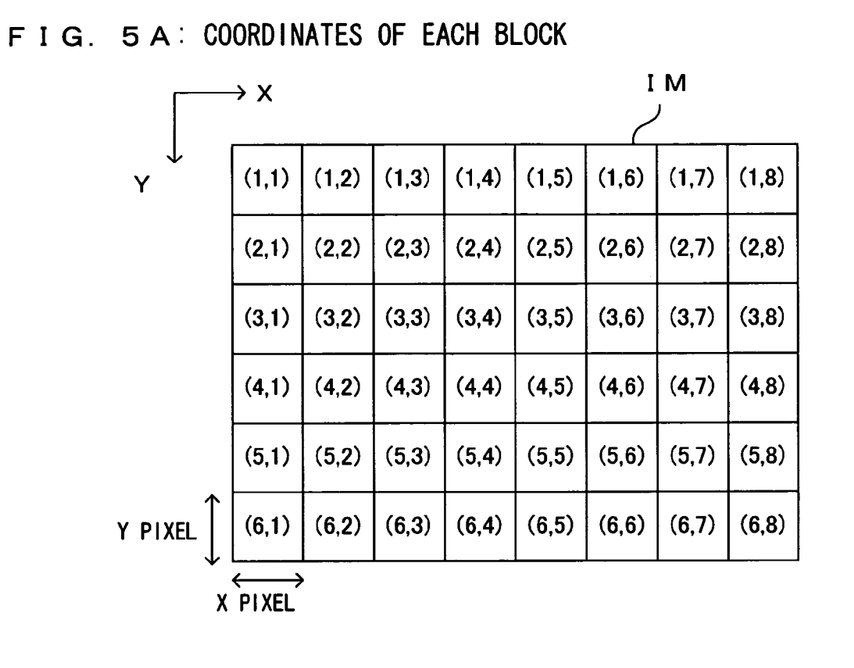
FIGS. 5A and 5B are diagrams showing an example of image data.
Figure 5B:
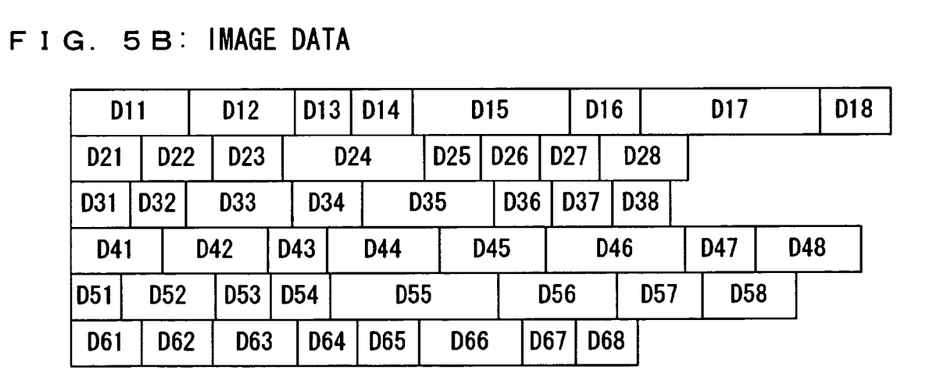

FIGS. 5A and 5B are diagrams showing an example of image data. Here, each block includes (x×y) pixels arranged in directions of coordinate axes X, Y as shown in FIG. 5A and an image IM in which eight blocks are arranged in an X-direction and six blocks are arranged in a Y-direction is thought as an example. Here, if x=y, this image IM is an image with an aspect ratio of 4:3. The number of pixels constituting each block and the number of blocks constituting the image are not limited to these and may be arbitrarily set. It is assumed that the respective blocks are identified by assigning the corresponding coordinates as shown in FIG. 5A. For example, the left upper block can be expressed by the coordinate (1, 1), and the block to the right of the former one can be expressed by the coordinate (1, 2). The other respective blocks can be similarly expressed. If the block expressed by the coordinate (m, n) needs to be indicated below, it is expressed using a symbol B(m, n).

On the other hand, image data as shown in FIG. 5B are included in an image file indicating such an image. Here, a symbol Dmn indicates image data representing the block expressed by the coordinate (m, n). For example, a symbol D11 indicates image data corresponding to the left upper block expressed by the coordinate (1, 1). In the memory card M, image data D11 to D68 of the respective blocks are stored in the order of D11, D12, ..., D18, D21, ..., D67, D68. This does not mean that these data are stored as they are in this order in the clusters of consecutive numbers, but means that these data are stored in the above order in accordance with an order of cluster chains designated by a FAT file system. Similarly, when the arrangement order of the image data in the memory card is referred to in the following description, it means the order of data in accordance with the order of the cluster chain.

If the image data are compressed in a compression format such as a JPEG format, the data lengths of the data Dmn expressing the respective blocks B(m, n) are not constant and differ depending on the contents of image in the blocks. Specifically, the image data shown in FIG. 5B are variable length data. Accordingly, if the image IM shown in FIG. 5A is divided into six line images each of which has a height of one block and a width of eight blocks, the total data amount of the image data D11 to D18 corresponding to a block row made up of eight blocks, e.g. blocks B(1, 1) to B(1, 8) and the total data amount of the image data D21 to D28 corresponding to a block row made up of eight blocks, e.g. blocks B(2, 1) to B(2, 8) are not necessarily the same as shown in FIG. 5B.

Next, the flow of data processing upon reading an image file including such image data from the memory card M and printing an image corresponding to this image file on a sheet P using the print mechanism 50 will be described. Printing by the print mechanism 50 is performed by forming a band image of a specified width every time while the sheet P is conveyed in a specified direction at a specified sheet feed pitch and the carriage 53 is reciprocally moved to scan in a direction orthogonal to the specified direction. The band in this case is made up of at least one block row, and the band width corresponds to the width of a nozzle row arranged in the print head 55. Accordingly, for one scanning movement of the carriage 53, print data (band data) of at least one band needs to be fed from the decoder 75 to the print mechanism 50 via the print data generator 76.

In this embodiment, the decoder 75 decodes the image data by the block and supplies the decoded data to the print data generator 76. The print data generator 76 generates print data (band data) in band units by rearranging the decode data in block units into those in block row units and rearranging data in block row units into those in band units, and transmits a print control signal including the band data to the print mechanism 50, whereby the image is printed by the print mechanism 50.

(1) Case of Not Rotating the Image

If an image is printed without being rotated, i.e. a moving direction of the carriage 53 coincides with the X-axis direction of FIG. 5A, an order of data requested by the decoder to the file system 74 for decoding coincides with an arrangement order of the image data in the memory card M. Accordingly, the decoder 75 may request the data from the leading one of the image file to the file system 74.

Figure 6A:
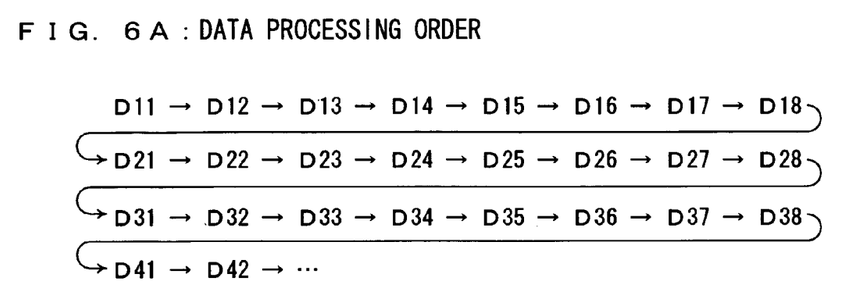
FIGS. 6A and 6B are diagrams showing an image data processing order in the case of not rotating an image.
Figure 6B:
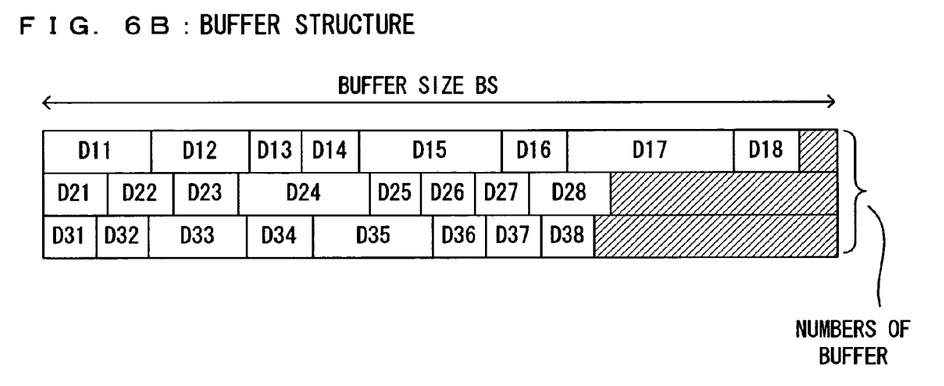

FIGS. 6A and 6B are diagrams showing an image data processing order in the case of not rotating an image. In this case, as shown in FIG. 6A, an order of data requested by the decoder 75 is same as an order of arrangement in the memory card M, i.e. D11, D12, D13, . . . , D68. At this time, if band data corresponding to one block row, i.e. D11 to D18 are prepared, one block row can be printed. Accordingly, if image data of one or more block rows are saved in one line buffer of the image data buffer 742 as shown in FIG. 6B, decoding and printing for this block row can be performed without any readout from the memory card M halfway. If the readout and decoding of data of the next block row are completed until printing of at least this block row is completed, the image can be printed within a short period of time by successively performing printing operations without delay.

Accordingly, in the case of not rotating the image, it is sufficient to provide at least one line buffer capable of saving image data of the data length corresponding to one block row. In other words, the read unit of image data from the memory card M may set to the one corresponding to about one block row. Although one block row and one band are described to have the same height here, a plurality of block rows frequently constitute one band in actual printing operations. In such cases, the readout of image data from the memory card M, the decoding and the printing operation based on band data after decoding can be smoothly performed if line buffers equal to or more than the number of block rows constituting one block are provided.

Hatched parts in FIG. 6B represent unnecessary data which are read together with necessary data when the file system 74 reads image data of the determined data length, but not used for the decoding of these block rows. If the amount of data in this part is large, an extra time is taken for processing due to many unnecessary reading operations. Thus, it is desirable to maximally reduce the data in this part. To this end, the data length of one line buffer is desirably set equal to or larger than a maximum expected data amount (e.g. 64 KB) of image data corresponding to one block row.

Figure 7A:
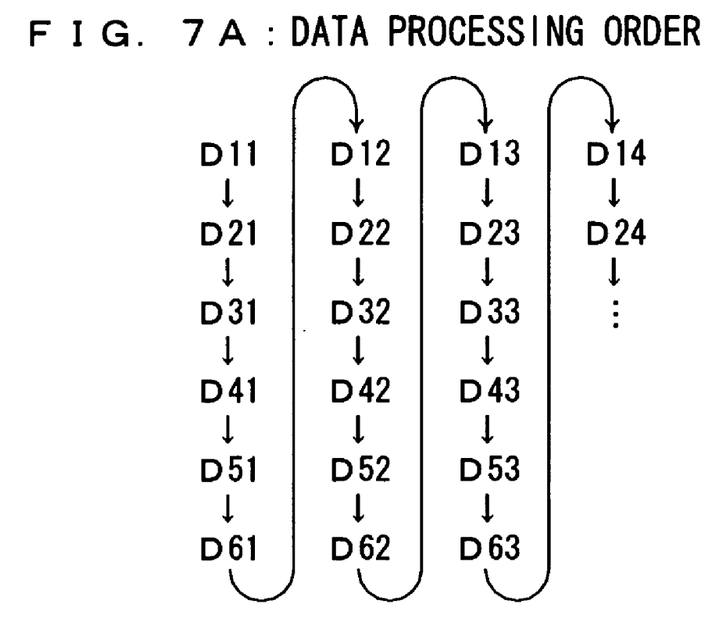
FIGS. 7A and 7B are diagrams showing an image data processing order in the case of rotating an image.
Figure 7B:
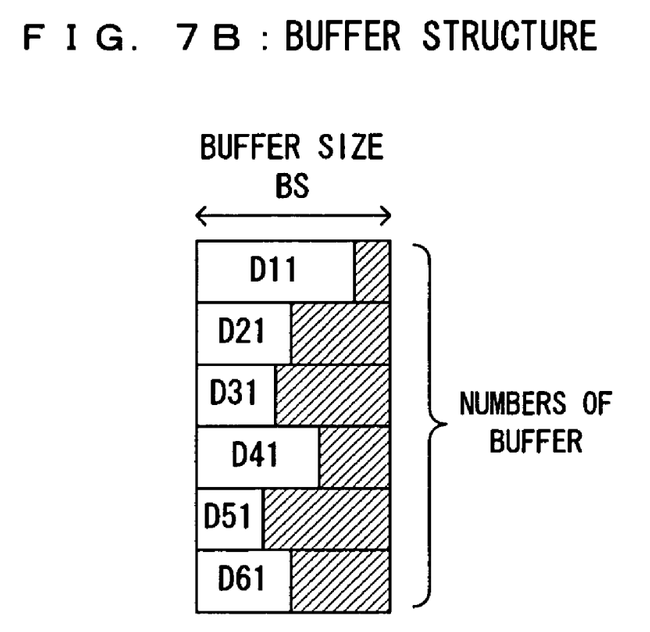

(2) Case Where an Image is Rotated and an Image Data Amount is Larger than a Buffer Capacity FIGS. 7A and 7B are diagrams showing an image data processing order in the case of rotating an image. In the case of printing an image while rotating it, for example, by 270°, the scanning/moving direction of the carriage 53 is the Y-direction in FIG. 5A, i.e. a column direction orthogonal to the arrangement order of the image data. Thus, an order of the image data requested by the decoder 75 is D11, D21, D31, . . . , D68 as shown in FIG. 7A. In order to obtain print data of one band, at least data of six blocks D11, D21, D31, D41, D51 and D61 are necessary. Since data of the other blocks are stored between these data on the memory card M, these data cannot be read in one line buffer and are respectively saved in different line buffers. Therefore, line buffers equal to or more than the number of blocks constituting the vertical column of the image (six in this embodiment) are necessary.

On the other hand, out of the data read from the memory card M and saved in the respective buffers, data necessary for the decoding are only those of six blocks and all the other data are unnecessary. Accordingly, it is sufficient for the respective line buffers in this case to have a size capable of saving image data of one block (e.g. 4 KB: corresponding to one cluster used in the FAT32 file system). By setting the size of the line buffers to this size, it is possible to perform the processing with a shorter period of time by reducing the readout of unnecessary data. In this way, when the image is to be rotated and the image data amount is larger than the buffer capacity, the read unit of the image data from the memory card M may be reduced to about one block. If one band has a width corresponding to a plurality of blocks, the read unit of the image data may be accordingly increased as described above. For example, if one band has a width of two blocks, the read unit of the image data may be set to about 2 blocks.

When the size of the image file is small and the image data buffer 742 has a capacity of saving all the image data, the processing time is, of course, shorter if all the data are read and saved in the image data buffer 742 beforehand. Accordingly, it is better to increase the read unit of the image data from the memory card M when all the image data can be saved in the image data buffer 742 even if the image is to be rotated.

(3) Case of Printing a Plurality of Images Side by Side

Figure 8:
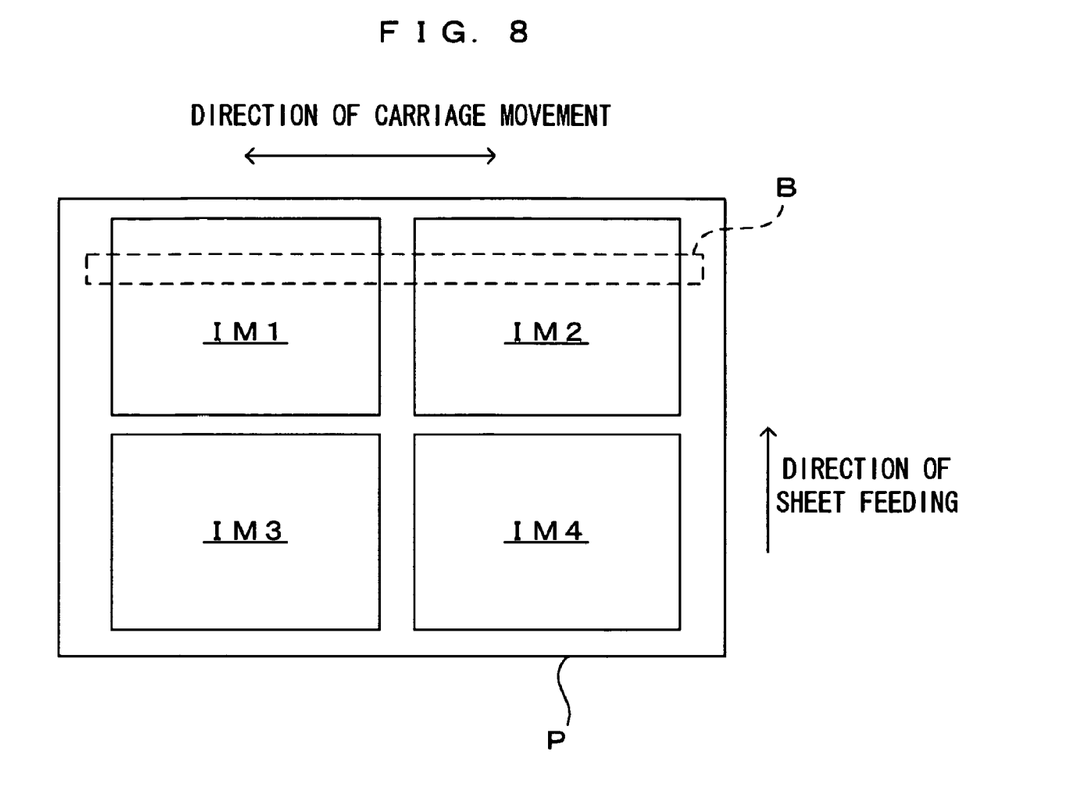
FIG. 8 is a diagram showing a state where a plurality of images are printed side by side on one sheet.

FIG. 8 is a diagram showing a state where a plurality of images are printed side by side on one sheet. In FIG. 8 is shown a case where 2×2 images arranged in vertical and horizontal directions, i.e. a total of four images IM1, IM2, IM3 and IM4 are printed on one sheet. In this case, since parts of a plurality of images IM1, IM2 are included in one band B as shown in FIG. 8, it is necessary to alternately process image data belonging to a plurality of image files in order to generate print data corresponding to one band. Thus, it is more efficient to save data belonging to the respective image files little by little than to save a large amount of image data belonging to one image file in the image data buffer 742. Therefore, it is preferable to decrease the read unit of data from the memory card M in this case.

(4) Case of Image File Represented by Pixels

In an image file of a data format, which is already represented by data of pixels upon being read from the memory card, such as the bitmap format and the TIFF format, decoding equivalent to the one in the JPEG format in which data are highly compressed is basically unnecessary. Further, an image file of this type of data format generally has a large file size and it is not realistic to save all the image data in the image data buffer 742 in many cases. Accordingly, the readout of image data from the memory card M may be arranged as follows so as to cope with the case where all the image data cannot be saved in the image data buffer 742.

Figure 9A:
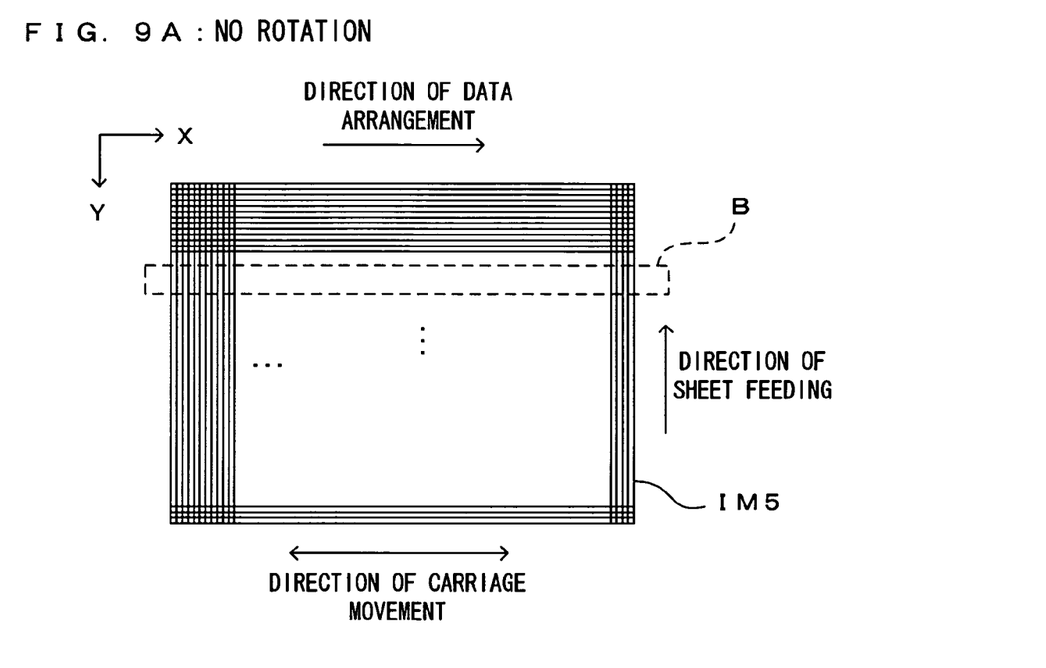
FIGS. 9A and 9B are diagrams showing an example of an image represented in pixel units.
Figure 9B:
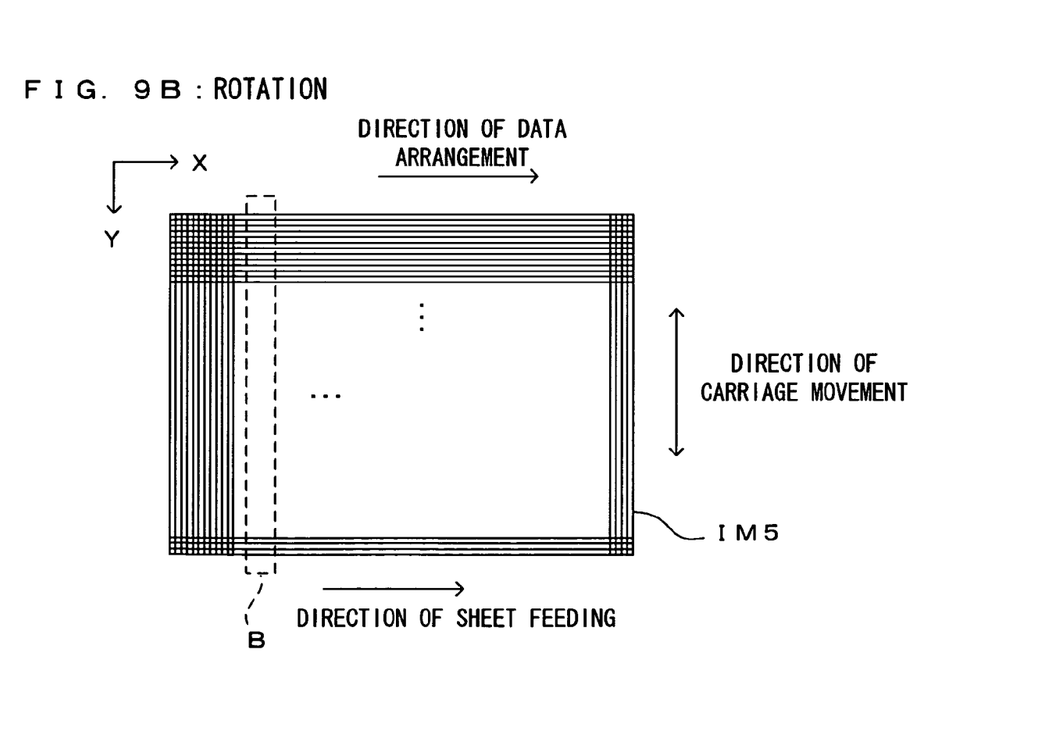

FIGS. 9A and 9B are diagrams showing an example of an image represented in pixel units, wherein FIG. 9A shows a state of a band in the case of printing an image IM5 represented by pixel unit data without being rotated and FIG. 9B shows a state of a band in the case of printing the same image IM5 while rotating it. In the case of not rotating the image, an arrangement direction of the image data and the longitudinal direction of the band, i.e. the scanning direction of the carriage 53 are the same. Accordingly, in order to generate print data of one band, image data of pixels, which are given by multiplying the pixel number of the image IM5 in the X-direction by the pixel number corresponding to the height of the band B in the Y-direction, are necessary. To this end, as many line buffers of the size corresponding to the data amount of the image data of the pixel number of the image IM5 in the X-direction as the pixel number corresponding to the height of the band B in the Y-direction may be prepared. The file system 74 reads image data of the pixel number of the image IM5 in the X-direction from the memory card M and writes them in the line buffer.

On the other hand, in the case of rotating the image, the data of only the pixel number corresponding to the width of the band B in the X-direction are read in accordance with the arrangement of the image data on the memory card M as shown in FIG. 9B. Accordingly, even if these data are written in the line buffer, the amount of data per line buffer is small.

On the contrary, as many line buffers as the pixel number of the image IM5 in the Y-direction (generally several hundreds) are necessary, which is practically impossible to realize. In other words, there are less advantages of using the line buffers for such data processing. Thus, the file system 74 does not use the image data buffer 742 in such cases and reads only requested data from the memory card M every time and supplies them to the decoder 74 upon a request of image data from the decoder 75.

(5) Judgment Flow of the Data Read Unit

Figure 10:
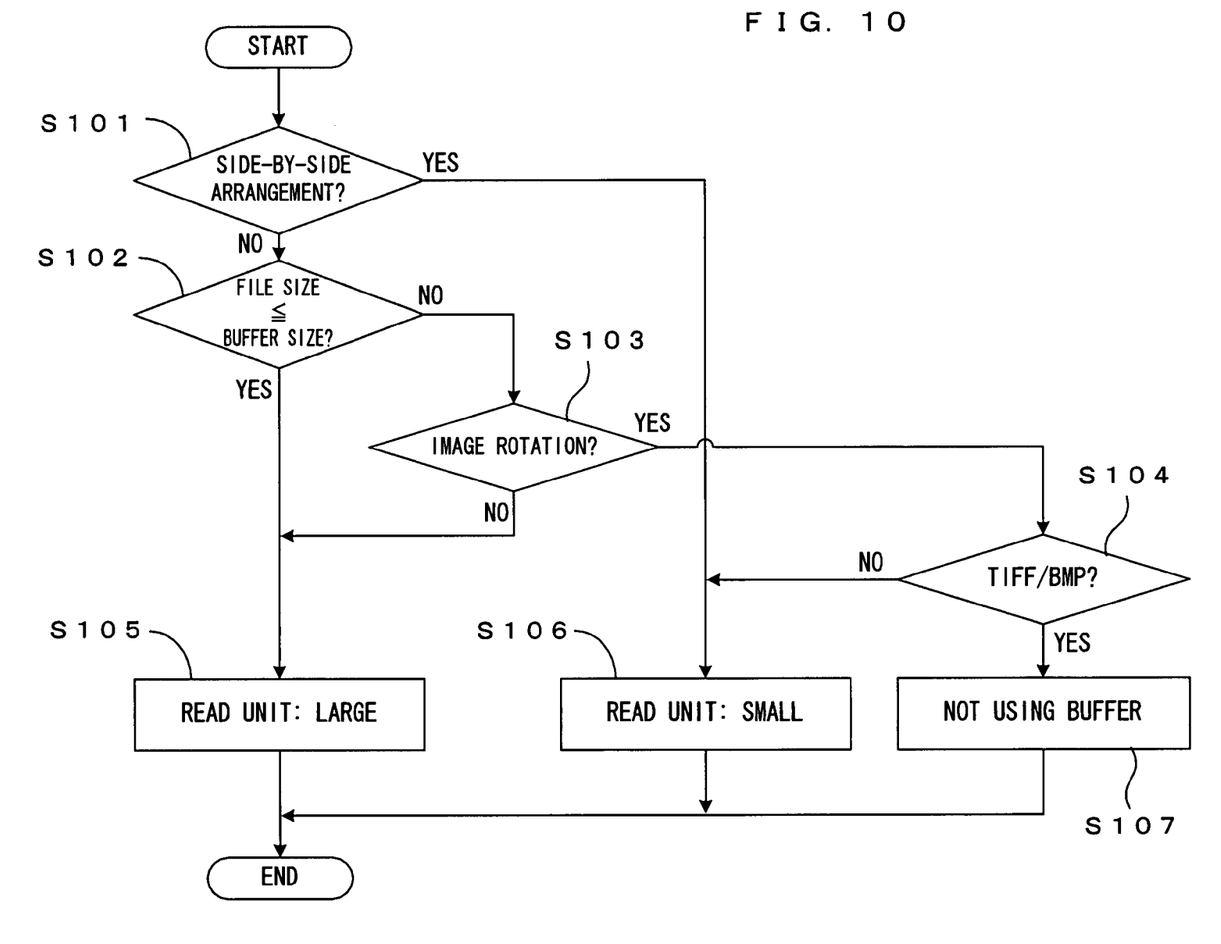
FIG. 10 is a flow chart showing a processing for judging the data read unit in this embodiment.

FIG. 10 is a flow chart showing a processing for judging the data read unit in this embodiment. In this embodiment, a data length (read unit: large) corresponding to image data of one block row of an image (eight blocks in this embodiment) and a data length (read unit: small) corresponding to image data of one block of the image are selectable as a data read unit upon reading image data from the memory card M and saving them in the image data buffer 742. It is also possible to select an operation of reading necessary data from the memory card M every time without using the image data buffer 742.

If a request from the decoder 75 alternately requires image data belonging to a plurality of image files, i.e. if a plurality of images are arranged side by side, such a case falls under the above case (3). Thus, the read unit of the image data from the memory card M is set to the small one (Steps S101, S106). By doing so, unnecessary data readout is reduced.

If one image file is to be processed and all the image data can be written in the image data buffer 742, i.e. the size of the image file is equal to or below the size of the image data buffer 742 (Step S102), the read unit of the image data is set to the large one (Step S105). By doing so, the number of accesses to the memory card M is reduced to make the processing more efficient.

Even if the image data is of such a size as not be completely saved in the image data buffer 742, the same processing is applied in the case of not rotating the image (Step S103). This case also falls under the above case (1).

If the image is to be rotated and the file format of the image file is the TIFF format or the bitmap (BMP) format (Step S104), such a case falls under the above case (4). Thus, a processing not using the buffer is selected (Step S107). On the other hand, in the case of another file format, the read unit of image data is set to the small one (Step S106) since such a case falls under the above case (2).

As described above, in this embodiment, the file system 74 changes the read unit upon reading the image data from the memory card M according to the form of the data request from the decoder 75 to the file system 74 and further according to the content of the image file. Thus, the data processing can be efficiently performed by reducing the readout of unnecessary data not requested by the decoder 75, suppressing a capacity necessary for the image data buffer 742 and suppressing the extension of the processing time resulting from such unnecessary readout. As a result, a necessary image can be quickly printed in this embodiment.

Although the print data generator 76 generates print data based on data processed by the decoder 75 and an image corresponding to an image file is printed by the print mechanism 50 in this embodiment, a similar argument can be made even in the case where the LCD screen 22 displays an image corresponding to an image file (e.g. preview image of a designated image file) based on data processed by the display decoder 75. In other words, an image can be quickly displaced on the LCD screen 22 in this embodiment by the above arrangement.

Second Embodiment

Next, a second embodiment of the image data processing apparatus according to the invention will be described. In the above apparatus of the first embodiment, the read unit of image data in the case where one image is to be displayed or printed and not to be rotated is the data length corresponding to the data amount of image data of one block (if one band is constituted by a plurality of block rows, the same number of blocks). However, since an image is converted into data in the form of variable length data in an image file of, e.g. the JPEG format, it is necessary to set the read unit to a relatively large one in order to reliably read image data of one block. As described above, it is not preferable to set a too large read unit since the readout of data unnecessary for data processing leads to waste of time.

Accordingly, in the second embodiment described below, such a waste is reduced by more optimally setting the read unit of image data depending on the situation in the case where one image is to be displayed or printed and not to be rotated. Except for setting the read unit of image data in the case of processing one image without rotating it as follows, the construction and basic operation of the apparatus according to the second embodiment are identical to those of the apparatus according to the first embodiment and, hence, are not described.

Figure 11:
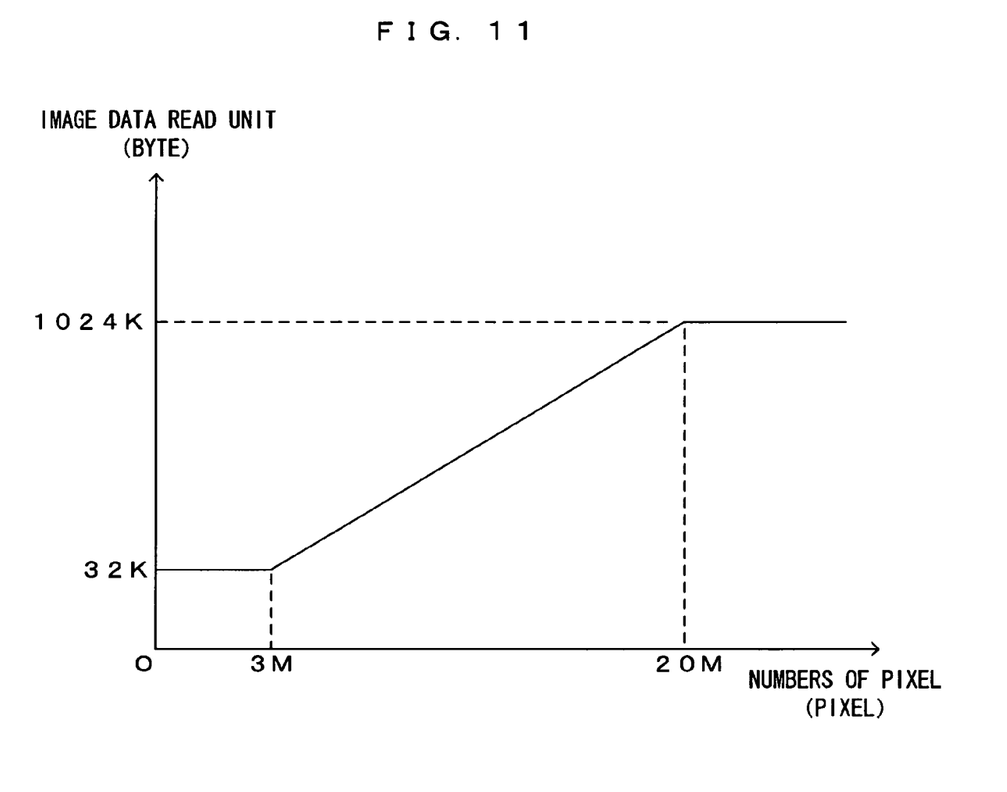
FIG. 11 is a graph showing the read unit of image data in the second embodiment.

FIG. 11 is a graph showing the read unit of image data in the second embodiment. In this embodiment, the read unit of image data from the memory card M is changed in multiple steps according the number of pixels constituting an image. More specifically, as shown in FIG. 11, for small image files with 3 M or less pixels (total number in a matrix arrangement) constituting an image, the read unit of image data is uniformly set at a minimum value of 32 KB. On the other hand, for large image files with 20 M pixels or more, the read unit of image data is uniformly set at a maximum value of 1024 KB. For image files whose pixel numbers are between 3 M pixels and 20 M pixels, the read unit is changed in proportion to the pixel number as shown in FIG. 11.

The reason for such setting is as follows. For example, in the case of processing and displaying or printing image data by the band, it is most efficient as a processing if image data of the next band can be read from the memory card M while image data of one band is displayed or printed. Here, when it is tried to read more data than necessary, efficiency as a system is reduced if data processing for displaying or printing the next band cannot be finished in time as a result of taking a longer time for the readout. Since a processing load generally increases according to the pixel number of an image in a processing for displaying or printing, processing efficiency as the entire system can be optimized by changing the read unit of image data according to the pixel number of an image file and well balancing out the reading processing and other processings.

Miscellaneous

In the embodiments described above, the memory card controller 72, the memory card driver 73 and the file system 74 function together as a "reader" of the invention. Any of the decoder 75, the print data generator 76 and the LCD controller 77 functions as a "data processor" of the invention, whereas the image data buffer 742 function as a "storage" of the invention. Further, the memory card M corresponds to a "storage medium". The print mechanism 50 and the LCD display 22 respectively correspond to a "printing unit" and a "display unit" of the invention.

The invention is not limited to the above embodiments, and various changes other than the above can be made without departing from the gist thereof. For example, although the file system 74 switches the read unit of image data in two steps according to the form of a request given from the decoder 75 in the first embodiment, it may be switched in more steps.

Although the file system 74 changes the buffer size BS and the number p of the line buffers 7421 and the like in the image data buffer 742 according to the form of a request given from the decoder 75 in the first embodiment, it is important in the invention to change the read unit of image data from the memory card M as the "storage medium" and it is not an essential requirement to make the size and number of line buffers variable. However, if it is tried to fix the size and number of line buffers while coping with a change in the read unit of image data, it is necessary to set the size and number of line buffers with margins, which takes up a large memory resource. Thus, in light of efficiently utilizing the memory resource, it is desirable to suitably change the construction of the image data buffer 742 according to a change of the read unit.

Although the read unit of image data is increased or decreased in proportion to the pixel number of an image in the second embodiment, a change of the read unit is not limited to a linear change in proportion to the pixel number and the read unit may be changed, for example, stepwise. In this case, a minimum step of the read unit change is desirably the size of the clusters (e.g. 4 KB in the FAT32 system) in the memory card. In this way, even if the read unit is changed according to the pixel number, access to the memory card can remain made by the cluster.

Although image files stored in the memory card insertable into and detachable from the apparatus body are read in the above respective embodiment, various storage media other than such a card-type one can be used as the "storage medium" of the invention. For example, it may be a storage medium including a magnetic disc or a stick-type storage medium. Further, a device having a function of storing image files including captured images such as a digital camera or a mobile phone and enabling the image files to be read via cable, radio or infrared communication n can also be used as the "storage medium" of the invention.

Although the print mechanism 50 is an ink-jet printer in the above embodiments, it may be an electrophotographic printer. Further, although the LCD screen 22 in the above embodiments displays images using an LCD display, it may display images by another display method such as an EL (electroluminescent device) display.

Although the invention is applied to the photo printer having the display function of displaying an image corresponding to an image file and the print function of printing the image in the above embodiments, the application object of the invention is not limited to the above photo printer. For example, the invention is also applicable to devices having only either one of the display function and the print function. Further, without being limited to apparatuses having such display and/or print functions, the invention is applicable to data processing apparatuses and data processing methods in general for reading an image file stored in a storage medium and applying a data processing thereto.

In the image data processing apparatus constructed as above, the reader may set a different read unit, for example, depending on whether or not an order of the image data requested by the data processor coincides with an arrangement order of the image data in the storage medium if the storage cannot save all the image data included in the image file. More specifically, it is preferable to set a larger read unit when the order of the image data requested by the data processor coincides with the arrangement order of the image data in the storage medium than when the both orders are at variance.

In the case where the order of the image data requested by the data processor coincides with the arrangement order of the image data in the storage medium, if image data other than those relating to a request are collectively read when the request is made from the data processor, it is worthwhile since theses data are successively requested from the data processor. Further, the number of accesses to the storage medium can be reduced, which is rather preferable in being able to efficiently perform the processing. On the other hand, in the case where the order of the requested image data and the arrangement order of the image data in the storage medium differ, even if other image data are collectively read together with the requested image data, there is a higher possibility that image data to be requested next are not included in the read data. As a result, it becomes necessary to read image data anew from the storage medium upon the next request of image data, and the already read data become unnecessary. A longer timer is required for the processing by as much as a time required for the readout of such unnecessary data, which is not efficient. Therefore, in such a case, it is better to set a smaller read unit of image data.

Accordingly, by setting a different read unit of image data from the storage medium depending on whether or not the order of the requested image data coincides with the arrangement order of the image data in the storage medium, the efficiency of the processing can be improved in either case. Particularly, it is desirable to set a larger read unit when the order of the requested image data coincides with the arrangement order of the image data in the storage medium than when they are at variance.

The reader may change the data length of the read unit according to the pixel number of the image represented by the image file when the order of the image data requested by the data processor coincides with the arrangement order of the image data in the storage medium.

As described above, the number of accesses to the storage medium can be reduced by collectively reading many data from the external storage medium and saving them in the storage when the order of the requested image data coincides with the arrangement order of the image data in the storage medium. However, if the mount of data to be read is excessively increased, there is a higher possibility of reading even unnecessary data and, in addition, it takes time until the readout of the data is completed. Thus, it is not realistic to increase the amount of data to be read more than necessary. Accordingly, by balancing a reading speed of image data from the storage medium and a processing speed for processing the read image data, the data readout and the data processing can be efficiently performed and the processing time as a whole can be shortened. Since a data processing generally tends to become complicated and take a longer time as the number of pixels constituting an image increases, if the pixel number of the image is known, the data readout and the data processing can be more efficiently performed by increasing the amount of data to be read as the pixel number of the image increases.

In this case, the reader preferably sets a minimum value and a maximum value of the data length of the image data read from the storage medium beforehand. This is because a longer time is required for the data readout if the amount of the image data read from the storage medium is extremely large, and access to the storage medium is frequently repeated and the efficiency of the data processing decreases if the data amount is extremely small.

For example, the reader may set a different read unit depending on whether the image file, to which the image data requested by the data processor belong, is a single file or cyclically switched among a plurality of image files stored in the storage medium. For example, there are cases where it is necessary to read image data little by little and cyclically from a plurality of image files stored in a storage medium such as the case of parallel data processing of the plurality of image files. In such cases, even if a large amount of data is read at once from one image file, it is lost when the data processing moves onto the next image file. Accordingly, it is preferable to set a different read unit of image data depending on whether a single image file is handled or a plurality of image files are handled. More specifically, it is preferable to set a smaller read unit when a plurality of image files are handled than when a single image file is handled.

Each image file in the storage medium may include image data obtained by dividing an image into a plurality of blocks having specified vertical and horizontal sizes and converting image contents of the respective blocks into data, and the data processor may process the image data representing each block collectively by the block. Further, the data processor may vertically or horizontally divide the image into a plurality of bands and collectively process the image data of the blocks included in each band.

Image files represented by such blocked data include, for example, those generated by the JPEG (Joint Photographic Expert Groups) data compression format. The invention can be suitably applied to image data processing apparatuses handling such image files. Further, image data processing apparatuses for processing image data by the band including a plurality of blocks include apparatuses for reading an image file of, e.g. the JPEG format and applying a data processing by the band to display or print an image. The invention can also be suitably applied to such apparatuses.

The reader may set a different read unit depending on whether or not an order of the image data requested by the data processor coincides with an arrangement order of the image data in the storage medium when image data individually representing a plurality of pixels constituting an image are arranged in the image file in the storage medium and the total data amount of the image data is larger than a storage capacity of the storage. Particularly, the reader may read image data from the storage medium and supplies them to the data processor every time if the image data are requested by the data processor when the order of the image data requested by the data processor is at variance with the arrangement order of the image data in the storage medium.

If the image data individually representing the respective pixels are arranged in the image file, data requests for data processing are issued by the pixel. Here, in the case where the order of the requested image data is the same as the arrangement order of the image data in the storage medium, if data corresponding to other pixels other than the requested image data are collectively read from the storage medium, these data can be used for the subsequent processing. On the contrary, in the case where the order of the requested image data is different from the arrangement order of the image data in the storage medium, even if data of a plurality of pixels are collectively read from the storage medium, there is a higher possibility of not using the data other than the requested ones. Particularly, if the amount of the image data is larger than the storage capacity of the storage and all the data cannot be saved in the storage, it unavoidably occurs to delete data read from the storage medium before being used for data processing. In order to avoid this, it is necessary to read the image data by the pixel. In other words, there is no merit of collectively reading the image data from the storage medium and saving them in the storage in this case and, rather, the processing time becomes longer by as much as a time required for the readout of unnecessary data. Accordingly, in such a case, it is preferable to read only the requested data from the storage medium every time. By reading only the necessary data in this way, the readout of unnecessary data can be eliminated.

Further, in this case, it is not always necessary to save the data read from the storage medium in the storage since the data representing the respective pixels are independent of each other and the data processing is individually applied to the data of each pixel read from the storage medium. Accordingly, in this case, the processing of saving the read data in the storage may be omitted. By doing so, the data processing time can be shortened. Formats of saving data represented by each pixel without compression fall under data formats of image data enabling such a processing. Representative data formats are, for example, the bitmap format and the TIFF (Tagged Image File Format).

The invention fulfills particularly marked effects in an image data processing apparatus further comprising a printing unit that prints an image corresponding to the image file based on print data, wherein the data processor applies a data processing to the image data to generate the print data, supplies the generated print data to the printing unit and requests image data to the reader in an order corresponding to an order of the print data supplied to the printing unit.

The same holds true for an image data processing apparatus further comprising a display unit that displays an image corresponding to the image file based on display data, wherein the data processor applies a data processing to the image data to generate the display data, supplies the generated display data to the display unit and requests image data to the reader in an order corresponding to an order of the display data supplied to the printing unit.

In these apparatuses, the process for generating the print or display data is generally performed not for the entire image, but by the block or band into which the entire image is divided to have a specified size. In such apparatuses, it is desirable in light of processing efficiency that an input by the readout of the image data from the storage medium and an output such as the data processing, display or print based on the read image data are balanced in just proportion. If the idea of the invention is applied to such apparatuses, print or display throughput can be improved.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image data processing apparatus, comprising:
a reader that reads image data included in an image file in read units of a specified data length from an external storage medium storing the image file;
a storage that temporarily saves the image data read by the reader; and
a data processor that makes a request for image data from the reader and applies a specified data processing to the image data given from the reader in response to the request;
wherein
the reader reads image data requested by the data processor from the storage and supplies them to the data processor and, if the image data requested by the data processor cannot be read from the storage, reads image data of a specified data length including the image data from the external storage medium and supplies them to the data processor, and the reader changes the read units according to a form of the request from the data processor, wherein the reader changes the data length of the read units according to the form of the request from the data processor, and the reader sets a different read unit depending on whether or not an order of the image data requested by the data processor coincides with an arrangement order of the image data in the external storage medium if the storage cannot save all the image data included in the image file.

2. The image data processing apparatus according to claim 1, wherein the reader sets a larger read unit when the order of the image data requested by the data processor coincides with the arrangement order of the image data in the external storage medium than when the both orders are at variance.

3. An image data processing apparatus, comprising:

a reader that reads image data included in an image file in read units of a specified data length from an external storage medium storing the image file;

a storage that temporarily saves the image data read by the reader; and a data processor that makes a request for image data from the reader and applies a specified data processing to the image data given from the reader in response to the request;

wherein the reader reads image data requested by the data processor from the storage and supplies them to the data processor and, if the image data requested by the data processor cannot be read from the storage, reads image data of a specified data length including the image data from the external storage medium and supplies them to the data processor, and the reader changes the read units according to a form of the request from the data processor, wherein the reader changes the data length of the read units according to the form of the request from the data processor and the reader changes the data length of the read units according to the pixel number of the image represented by the image file when the order of the image data requested by the data processor coincides with the arrangement order of the image data in the external storage medium.

4. The image data processing apparatus according to claim 3, wherein the reader sets a minimum value and a maximum value of the data length of the read units beforehand.

5. An image data processing apparatus, comprising:

a reader that reads image data included in an image file in read units of a specified data length from an external storage medium storing the image file;

a storage that temporarily saves the image data read by the reader; and a data processor that makes a request for image data from the reader and applies a specified data processing to the image data given from the reader in response to the request;

wherein the reader reads image data requested by the data processor from the storage and supplies them to the data processor and, if the image data requested by the data processor cannot be read from the storage, reads image data of a specified data length including the image data from the external storage medium and supplies them to the data processor, and the reader changes the read units according to a form of the request from the data processor, wherein the reader changes the data length of the read units according to the form of the request from the data processor and the reader sets a different read unit depending on whether the image file, to which the image data requested by the data processor belong, is a single file or cyclically switched among a plurality of image files stored in the external storage medium.

6. The image data processing apparatus according to claim 5, wherein the reader sets a smaller read unit when the image file, to which the image data requested by the data processor belong, is cyclically switched among a plurality of image files stored in the external storage medium than when the image file, to which the image data requested by the data processor belong, is a single file.

7. The image data processing apparatus as in claim 1, 3, or 5, wherein:

each image file in the external storage medium includes image data obtained by dividing an image into a plurality of blocks having specified vertical and horizontal sizes and converting image contents of the respective blocks into data, and the data processor processes the image data representing each block collectively by the block.

8. The image data processing apparatus as in claim 1, 3, or 5, wherein the data processor vertically or horizontally divides the image into a plurality of bands and collectively processes the image data of the blocks included in each band.

9. The image data processing apparatus as in claim 1, 3, or 5, further comprising a printing unit that prints an image corresponding to the image file based on print data, wherein the data processor applies a data processing to the image data to generate the print data, supplies the generated print data to the printing unit and requests image data to the reader in an order corresponding to an order of the print data supplied to the printing unit.

10. The image data processing apparatus as in claim 1, 3, or 5, further comprising a display unit that displays an image corresponding to the image file based on display data, wherein the data processor applies a data processing to the image data to generate the display data, supplies the generated display data to the display unit and requests image data to the reader in an order corresponding to an order of the display data supplied to the printing unit.

* * * * *